METHOD OF USING PROTECTIVE COATING OVER LAYER OF LITHIUM BEING DIFFUSED INTO SUBSTRATE

Filed Oct. 1, 1962 4 Sheets-Sheet 1

INVENTORS:
David Vernon Freck
James Wakefield
By: Pillars and Bowyer
ATTORNEY

INVENTORS:
David Vernon Freck
James Wakefield
By: Pillars and Bowyer
ATTORNEY

INVENTORS:
David Vernon Freck
James Wakefield
By: Pillars and Bowyer
ATTORNEY

INVENTORS:
David Vernon Freck
James Wakefield
By: Pillars and Bowyer
ATTORNEY

United States Patent Office 3,212,943

Patented Oct. 19, 1965

3,212,943

METHOD OF USING PROTECTIVE COATING OVER LAYER OF LITHIUM BEING DIFFUSED INTO SUBSTRATE

David Vernon Freck, Basingstoke, and James Wakefield, Woolhampton, England, assignors to Associated Electrical Industries Limited, London, England, a British company

Filed Oct. 1, 1962, Ser. No. 227,221

Claims priority, application Great Britain, Oct. 4, 1961, 35,776/61

4 Claims. (Cl. 148—188)

This invention relates to solid state devices in which a p-n junction is formed and has an important application in solid state radiation detectors for gamma and X-rays.

It is known to use devices embodying a reverse biased p-n junction for the detection of charged particles. In operation the devices are exposed to the radiation and when charged particles penetrate the depletion zone in the region of the p-n junction ionisation occurs and a reverse current pulses passes through the devices indicating the radiataion. By pulse height analysis energy spectroscopy can be carried out.

Whilst such detectors are perfectly suitable for charged particles they have hitherto been unsuited to the spectroscopy of gamma and X-rays.

For detection of this type of radiation a thicker depletion layer is required than is necessary for particle detection.

X-rays and gamma rays produce secondary $\beta$ particles in the depletion zone to cause conduction.

These $\beta$ particles are mainly produced as the result of three effects, (i) The Compton effect.
(ii) Photo electric effect.
(iii) Pair production effects.

Since it is the energy of the secondary $\beta$ particle which determines the signal pulse height it is desirable that a single energy of secondary $\beta$ particle shall result from a single energy incident gamma or X-ray. Whilst the second and third effects behave in this manner, the first, i.e. the Compton effect, does not, but gives readings over a wide energy band which makes spectroscopy difficult.

It is found, however, that the relative values of these effects vary with the atomic number of the semi-conductor material or materials forming the detector. With a material having a low atomic number the Compton effect predominates but with a material having a high atomic number the Compton effect is small compared with the photo electric and pair production effects and this renders possible accurate spectroscopy.

According to the present invention the method of manufacturing solid state p-n junction devices comprises treating a p-type semi-conductor member having an atomic number of at least 30 by a process in which lithium is diffused into the semi-conductor to form a p-n junction and then applying a reverse bias to the p-n junction when heated to a lower temperature to increase the thickness of the depletion zone.

Preferably the semi-conductor material is germanium.

The p-n junction may be formed by a process in which the lithium source may be located in a stream of inert gas and heated so that lithium vapour is deposited on the semi-conductor which would also be located in the inert gas stream downstream of the lithium and heated so that the lithium diffuses into it.

Preferably a layer of lithium is deposited on the surface of the semi-conductor which is then heated to cause the lithium to diffuse into the semi-conductor and form a p-n junction.

A reverse bias would then be applied to the junction at a lower temperature and for a sufficient length of time to produce the requisite thickness of depletion layer.

The invention also comprises a solid state radiation detector including a p-n junction formed in a semi-conductor material of atomic number not less than 30, together with contacts or leads for attachment to an electrical biasing and measuring circuit, means for cooling the semi-conductor material.

Preferably the device is encapsulated and sealed in a vacuum or alternatively is continuously pumped. The device may be cooled by attaching it to a heat sink, e.g. a metal block which is cooled, e.g. liquid cooled.

In order that the invention may be more clearly understood reference will now be made to the accompanying drawings, in which.

The p-n junction may be formed by a process in which the lithium source may be located in a stream of inert gas, e.g. argon, and heated preferably to about 700° C. The semi-conductor would also be located in the inert gas stream downstream of the lithium and heated, e.g. to about 200° C. so that the lithium diffuses into it and forms a p-n junction. A reverse bias would then be applied to the junction at a lower temperature, e.g. 70° C. for a sufficient length of time to produce the requisite thickness of depletion layer.

Figure 1A:
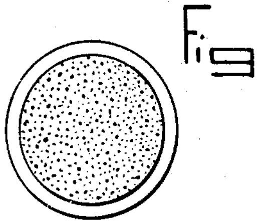
FIG. 1A shows a plan view of an initial germanium wafer.
Figure 1B:
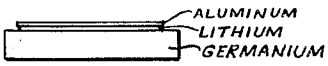
FIG. 1B is an elevation of the wafer shown in FIG. 1A with additionally a protective covering on the wafer.

According to a preferred method a p-n junction is first prepared in a circular wafer of p-type germanium as shown in FIG. 1. The resistivity of the germanium single crystal material is about 5 ohms per centimetre and it is a p-type. A circular patch of lithium about 1.5 centimetres in diameter is evaporated on to one face of the wafer in a vacuum evaporation plant. The film of lithium is indicated by the shading in FIG. 1A and preferably has a thickness of 1 micron. Without removing the wafer from the vacuum in the evaporation plant a layer of aluminium is evaporated on to the lithium by any suitably known process to prevent oxidation of the lithium when it is removed from the evaporation plant.

Figure 2:
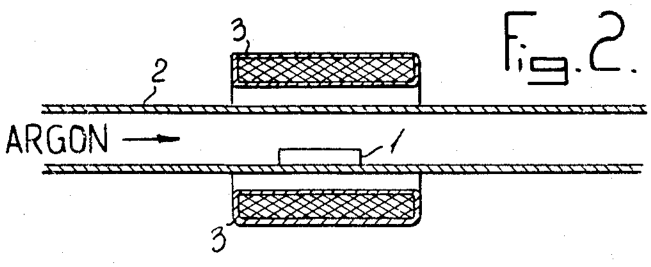
FIG. 2 shows diagrammatically the heating device.
Figure 7:
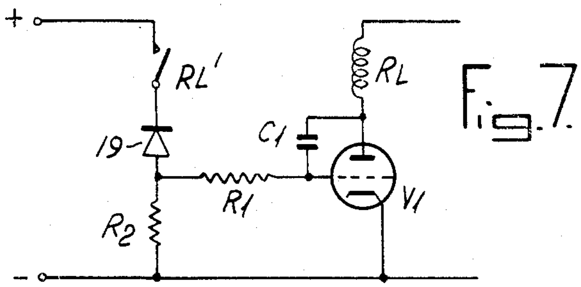
FIG. 7 is an electrical circuit arrangement for a temperature control circuit.
Figure 3:
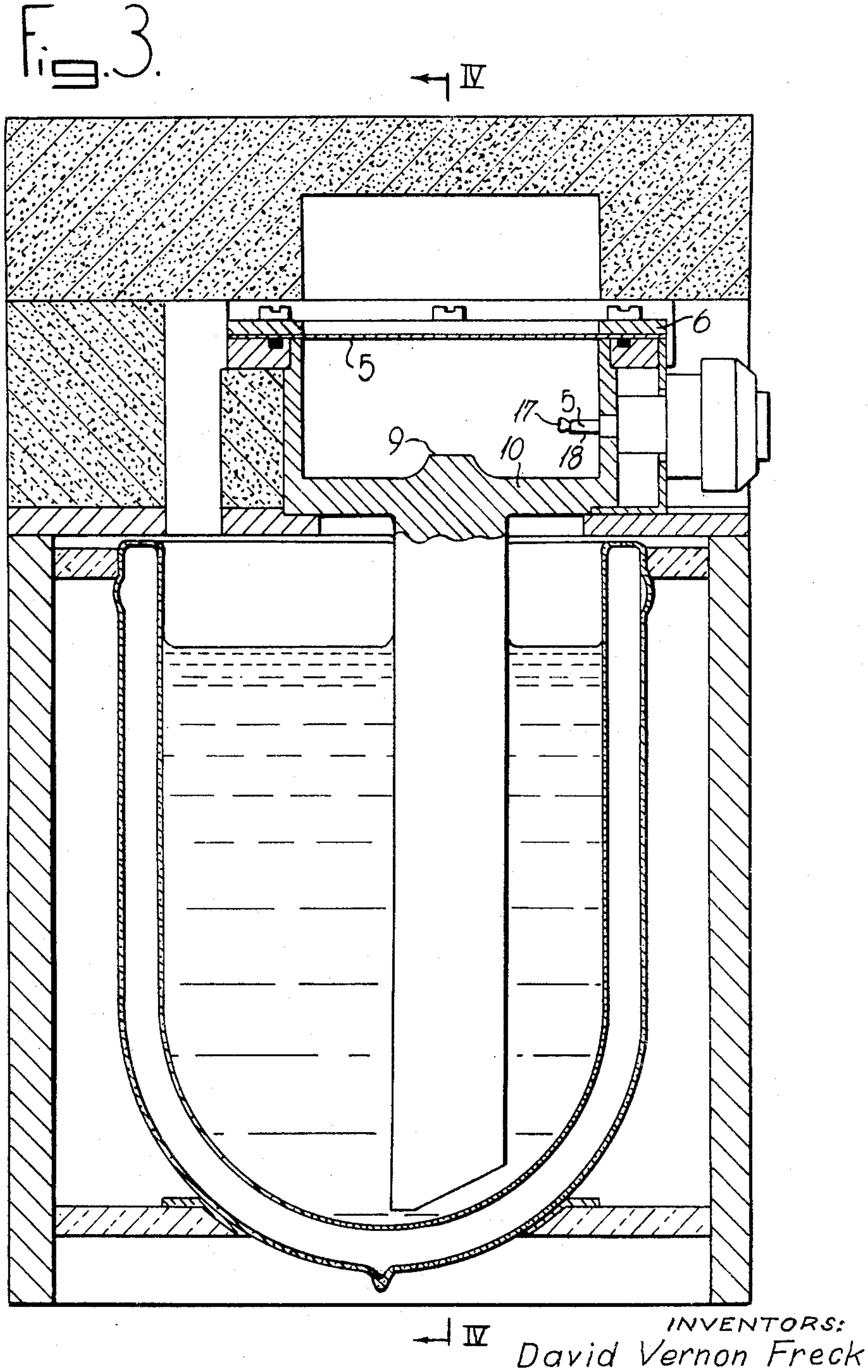
FIG. 3 is a vertical sectional view of the heating can.
Figure 4:
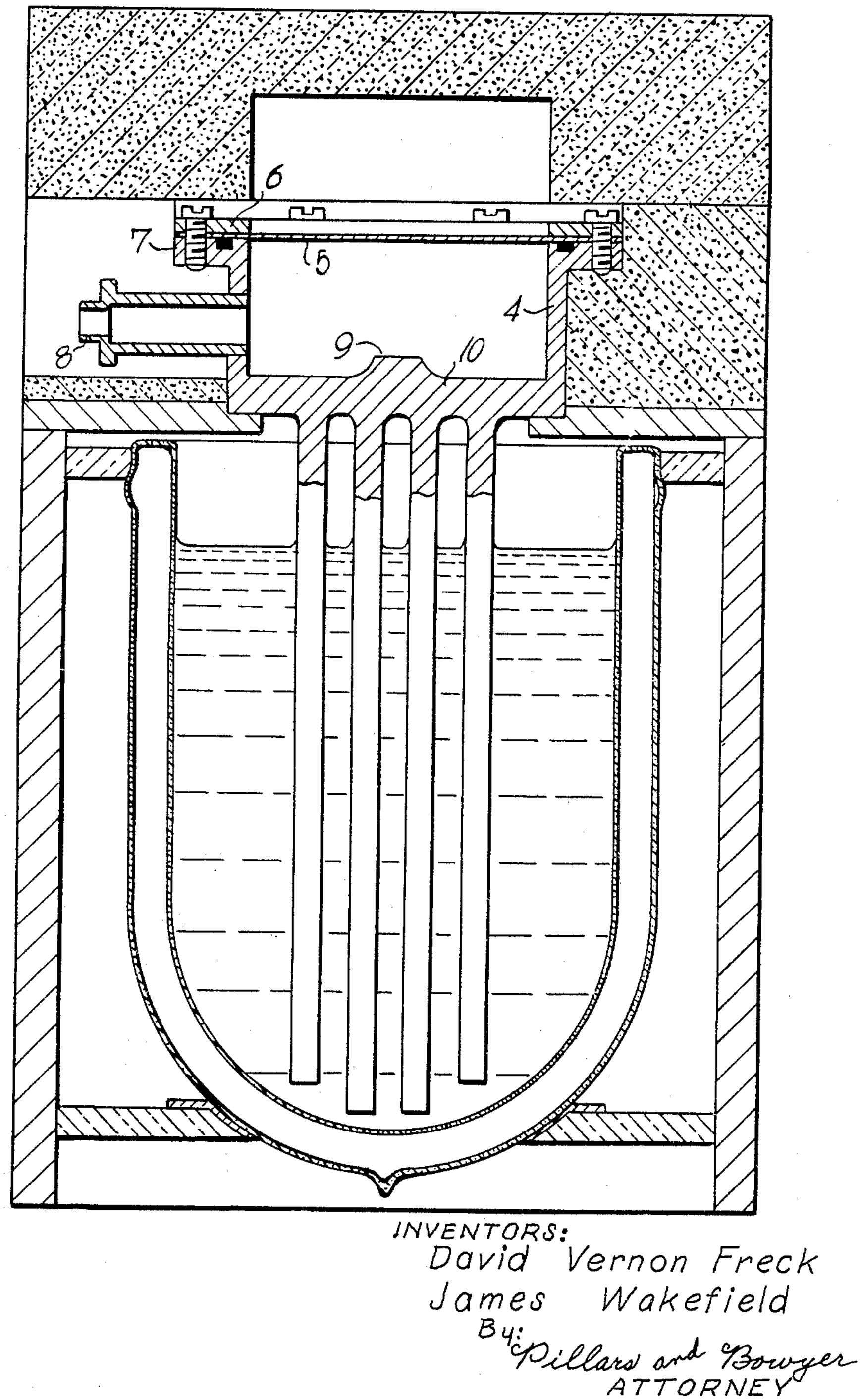
FIG. 4 is a section on the line IV—IV of FIG. 3.
Figure 5:
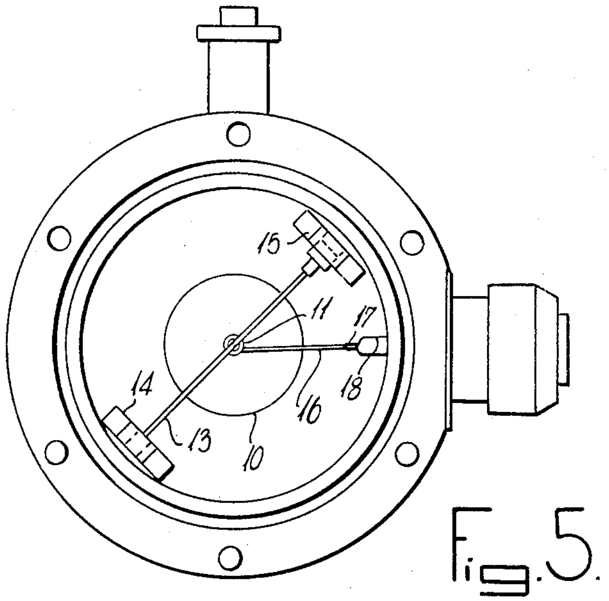
FIG. 5 is a plan view of the device with the top cover removed.
Figure 6:
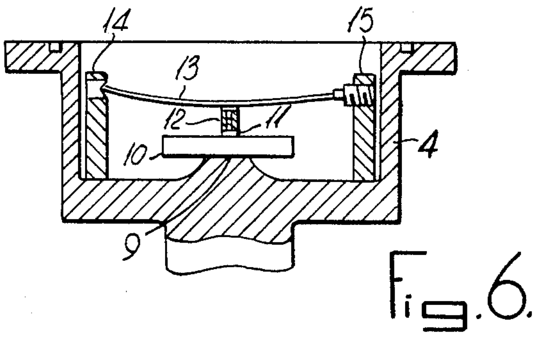
FIG. 6 is a vertical section on the line VI—VI of FIG. 5.

As shown diagrammatically in FIG. 2, the germanium wafer is then heated to 400° C. in an inert atmosphere by placing it in a silica tube 2 through which argon gas is flowing. The heating may be by means of an electrical tubular furnace indicated by the reference 3. The heating is continued for two minutes during which time the lithium diffuses into the germanium by the normal thermal diffusion process. The diffusion should extend to a distance of about 500 microns. Since the lithium is a donor impurity a p-n junction is formed in the p-type germanium. This slice with the p-n junction formed in it is now mounted in a can as shown in FIGS. 4–6. The can is formed of a copper cylinder 4, the top of which is closed by an aluminium disc 5 held in place by a brass ring 6 bolted to a flange 7 extending around the side wall of the can 4. The can is evacuated through the tube 8. The p-type side of a germanium wafer 10 is soldered on to a boss 9 on the base of the copper can, as shown in FIGS. 5 and 6. Electrical contact is made to the n-type side of the wafer by means of a metal pad 11 carried on an insulating rod 12 on a spring 13 extending diametrically across the container 4 between supports 14 and 15. A connecting wire 16 extends between the pad 11 and a vacuum type electrical lead 17 (FIG. 3) extending through an insulating bush 18. When the specimen has been inserted the can is closed by the aluminium disc 5 and the can evacuated by means of a vacuum pump operating through the duct 8. The junction is now "drifted" by an ion drift process to give a p-i-n structure. When it is at an elevated temperature a reverse bias is applied to the junction and the depletion area slowly increases in thickness. At this time it is important to avoid thermal runaway. It will be appreciated that if the reverse current rises at a given temperature and reverse voltage (as it will do when the depletion area increases in thickness, the current being proportional to the thickness for large regions), extra power is dissipated. The temperature and thus the reverse current in the depletion area will rise still further and the system may become unstable and run away. In order to avoid this thermal run-away FIG. 7 shows a circuit for providing current limitation. In FIG. 7 the specimen indicated 19 is connected in series with a resistor $R_2$ and relay contacts RL′ across + and − supply terminals of a D.C. supply which will normally be about 500 volts so that the D.C. voltage will be applied in reverse across the p-n junction. The voltage developed across $R_2$ is applied through a resistor $R_1$ to the grid of a valve $V_1$ which has a relay coil RL in its anode circuit and a capacitor $C_1$ connected between its anode and grid so that it acts as a Miller integrator. Initially the relay contacts RL′ are closed and the reverse D.C. voltage across the p-n junction causes the junction to start to run away and hence the current increases. Increasing volts appear across the resistance $R_2$ applying a larger input voltage to the valve $V_1$, the Miller has the property that $$V_0=\frac{-1}{R_1C_1}\int Vi\ dt+\text{constant}$$

As the voltage across $R_2$ increases the anode cathode voltage of the valve drops and the relay coil takes more current until the contacts RL′ open. The voltage across $R_2$ is now zero so that the current in the relay coil RL drops and the contacts again close. Thus the average current is held constant and the average power dissipated in the device held constant.

The time required to "drift" a given thickness is proportional to $(Pt)^{1/3}$ where P is the power dissipated in the device and $t$ the time of "drift." The lifetime too of the material also affects the rate of "drift."

For typical material 500 v. and an average current of 2 ma. about 100 hours is required to "drift" 2 mm. A "drifted" region of 4 mm. or thereabouts would make a reasonable spectrometer up to about 2 mev. gamma ray energy. This would require 800 hours "drift" at 1 watt or less time at higher powers.

After "drifting" the spectrometer is ready to use. The can and germanium are cooled to liquid air temperature by pouring liquid air into the Dewar vessel K, into which solid copper fins L dip. The reverse current of the junction drops now to less than $10^{-8}$ amps and noise from this current is negligible.

Figure 8:
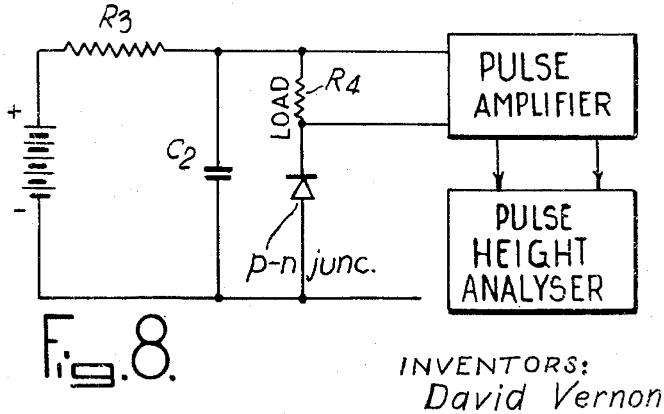
FIG. 8 shows in block form the arrangement of the device.

The device is connected in the circuit as shown in FIG. 8. Charge pulses in the p-i-n junction caused by the gamma rays are amplified by a low noise pulse amplifier and analysed by a pulse height analyser. Normal bias and load resistor values are about 50 volts and 50 megohms respectively.

What we claim is:

1. A method of manufacturing solid state p-i-n junction devices consisting in the steps of first depositing onto a p-type semi-conductor a thin layer of lithium from a lithium vapor at about 700° C., depositing a protective coating thereon of aluminum to prevent oxidation, heating the semi-conductor to a temperature of about 200° C. to about 400° C. to cause the lithium to diffuse and to form a p-n junction and depletion zone and then applying a reverse electrical bias to the junction when heated to a lower temperature of approximately 70° C. to increase the thickness of the depletion zone and form a p-i-n junction.

2. A method of manufacturing solid state p-i-n junction devices consisting in depositing onto a p-type semiconductor a thin layer of lithium from a lithium vapor at about 700° C. to form a p-n junction with a depletion zone, applying a protective coating on the lithium to prevent oxidation of the lithium, heating the semi-conductor to a lower temperature, and while so heated applying a reverse electrical bias to the junction to increase the thickness of the depletion zone and form a p-i-n junction.

3. The method of claim 2 wherein the semi-conductor is germanium.

4. The method of claim 2 wherein the protective covering is aluminum.

References Cited by the Examiner

UNITED STATES PATENTS

| | | | |
|---|---|---|---|
| 2,816,847 | 12/57 | Shockley | 148—188 |
| 2,957,789 | 10/60 | Pell | 148—188 |
| 2,991,366 | 7/61 | Salzberg | 250—83.3 |
| 3,016,313 | 1/62 | Pell | 148—188 |
| 3,022,568 | 3/62 | Nelson | 29—25.3 |
| 3,043,955 | 7/62 | Friedland | 250—83.3 |
| 3,044,147 | 7/62 | Armstrong | 29—25.3 |

DAVID L. RECK, *Primary Examiner.*

JAMES W. LAWRENCE, BENJAMIN HENKIN, *Examiners.*